Nov. 11, 1930.    H. WAHL ET AL    1,781,485
GENERATING POWER IN INTERNAL COMBUSTION ENGINES
Filed Feb. 11, 1929
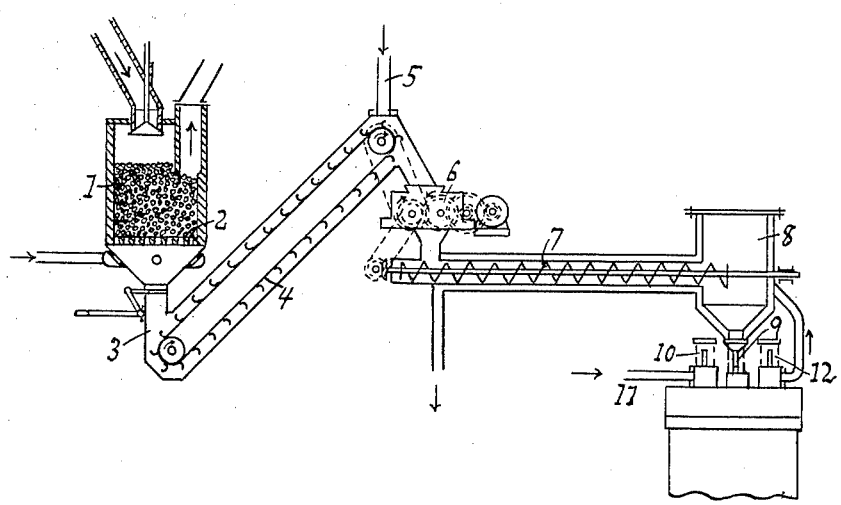
Inventors
Hans Wahl
Albert Fischer
By their Attorneys Patented Nov. 11, 1930

1,781,485

UNITED STATES PATENT OFFICE

HANS WAHL AND ALBERT FISCHER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

GENERATING POWER IN INTERNAL-COMBUSTION ENGINES

Application filed February 11, 1929, Serial No. 339,203, and in Germany February 29, 1928.

The present invention relates to the operation of internal combustion engines with pulverulent fuel.

We have found that power can advantageously be generated by operating internal combustion engines with still hot pulverized coking products, especially residues from the low-temperature carbonization of carbonaceous substances, so as to utilize their contained heat as much as possible. The said hot pulverized coking products may be used in admixture, if desired, with superheated steam. Internal combustion engines may also be operated according to our invention with pulverized cold or heated coking products in conjunction with superheated steam. For example, the coking residues obtained in the low-temperature carbonization of brown coal are passed direct, by means of suitable conveying means, from the carbonization furnace to a mill in which they are pulverized, air being excluded, and then to the engine, for example a Diesel engine. The temperature of the fuel is preferably about 600° C., and the coke may, if necessary, be heated, for example by exhaust gases or superheated steam, to the said temperature before admitting it to the engine. In such cases the pulverized solid residues may be introduced into the engine along with superheated steam, the latter then reacting directly with the fuel in the cylinder space and forming water gas. The fuel may also, prior to its admission into the engine, be laden with steam in such a way that the individual particles of the fuel are already surrounded by a readily inflammable envelope of water gas on entering the combustion chamber. The water gas effects the instantaneous ignition of the mixture of gas, air and coke. Again, for example, solid coking products at ordinary temperature may be preheated before admission into the engine and raised, by means of highly superheated steam, to a temperature of from 600° to 700° C., suitable for the production of water gas. The requisite steam may be generated, for example, by means of the exhaust gases.

It is advantageous that the engine and coking plant be so disposed, in combination, as to utilize the heat as fully as possible. For example, the heat of the exhaust gases may also be employed for predrying the coal for the low-temperature carbonization process, and the injection steam can be produced in cooling particularly hot parts of the producer. Moreover, in order to stimulate combustion, a certain amount of readily combustible substances, such as brown coal, oil or combustible gas, may be admitted into the combustion chamber shortly before the injection of the coking products.

Our invention may be further illustrated by the accompanying drawing showing in vertical section a plant suitable for carrying out our invention.

The hot low-temperature carbonization residues fall from the carbonization furnace 1 through the grate 2 into the trough 3, whence they are passed into the mill 6 by means of the bucket conveyor 4, while keeping them in an atmosphere of an inert gas, for instance, carbon dioxide, introduced by pipe 5. A screw conveyor 7 carries the ground fuel into the hopper 8 arranged above the engine. The screw conveyor and the hopper, if desired also the bucket conveyor and the mill, may be heated, for instance, by means of the exhaust gases. The pulverized fuel is introduced through a valve 9 into a supply chamber, whence it is blown into the combustion chamber by means of superheated steam supplied by pipe 11 when opening the valve 10. 12 is the exhaust valve.

What we claim is:—

1. A process for generating power which comprises operating internal combustion engines with still hot pulverized coking products.

2. A process for generating power which comprises operating internal combustion engines with still hot pulverized coking products, in conjunction with superheated steam.

3. A process for generating power which comprises operating internal combustion engines with pulverized coking products in conjunction with superheated steam.

4. A process for generating power which comprises operating internal combustion engines with pulverized coking products in conjunction with superheated steam of a temperature sufficient to heat the said pulverized products to temperatures between about 600° and 700° C.

5. A plant for generating power comprising a carbonization furnace, a receptacle into which the coking products are withdrawn, a mill, means for conveying the coking products from the said receptacle into the mill, a storage receptacle, means for conveying the pulverized coking products from the mill into the said storage receptacle, a chamber for supplying the said pulverized products from the said storage receptacle into the combustion chamber of an internal combustion engine and means for introducing steam into said supply chamber.

6. A plant for generating power comprising a carbonization furnace, a receptacle into which the coking products are withdrawn, a mill, means for conveying the coking products from the said receptacle into the mill, a storage receptacle, means for conveying the pulverized coking products from the mill into the said storage receptacle, a jacket surrounding the said storage receptacle and the means for conveying the pulverized products from the mill to the said storage receptacle, means for passing a hot gas through the said jacket, a chamber for supplying the said pulverized products from the said storage receptacle into the combustion chamber of an internal combustion engine.

7. A plant for generating power comprising a carbonization furnace, a receptacle into which the coking products are withdrawn, a mill, means for conveying the coking products from the said receptacle into the mill, means for introducing a gas into the said conveyor, a storage receptacle, means for conveying the pulverized coking products from the mill into the said storage reecptacle, a jacket surrounding the said storage receptacle and the means for conveying the pulverized products from the mill to the said storage receptacle, means for passing a hot gas through the said jacket, a chamber for supplying the said pulverized products from the said storage receptacle into the combustion chamber of an internal combustion engine and means for introducing steam into the said supply chamber.

In testimony whereof we have hereunto set our hand:

HANS WAHL.
ALBERT FISCHER.